Nov. 29, 1960 J. M. JANICKE 2,962,637
MAGNET CHARGER ADAPTER
Filed March 21, 1957 2 Sheets-Sheet 2
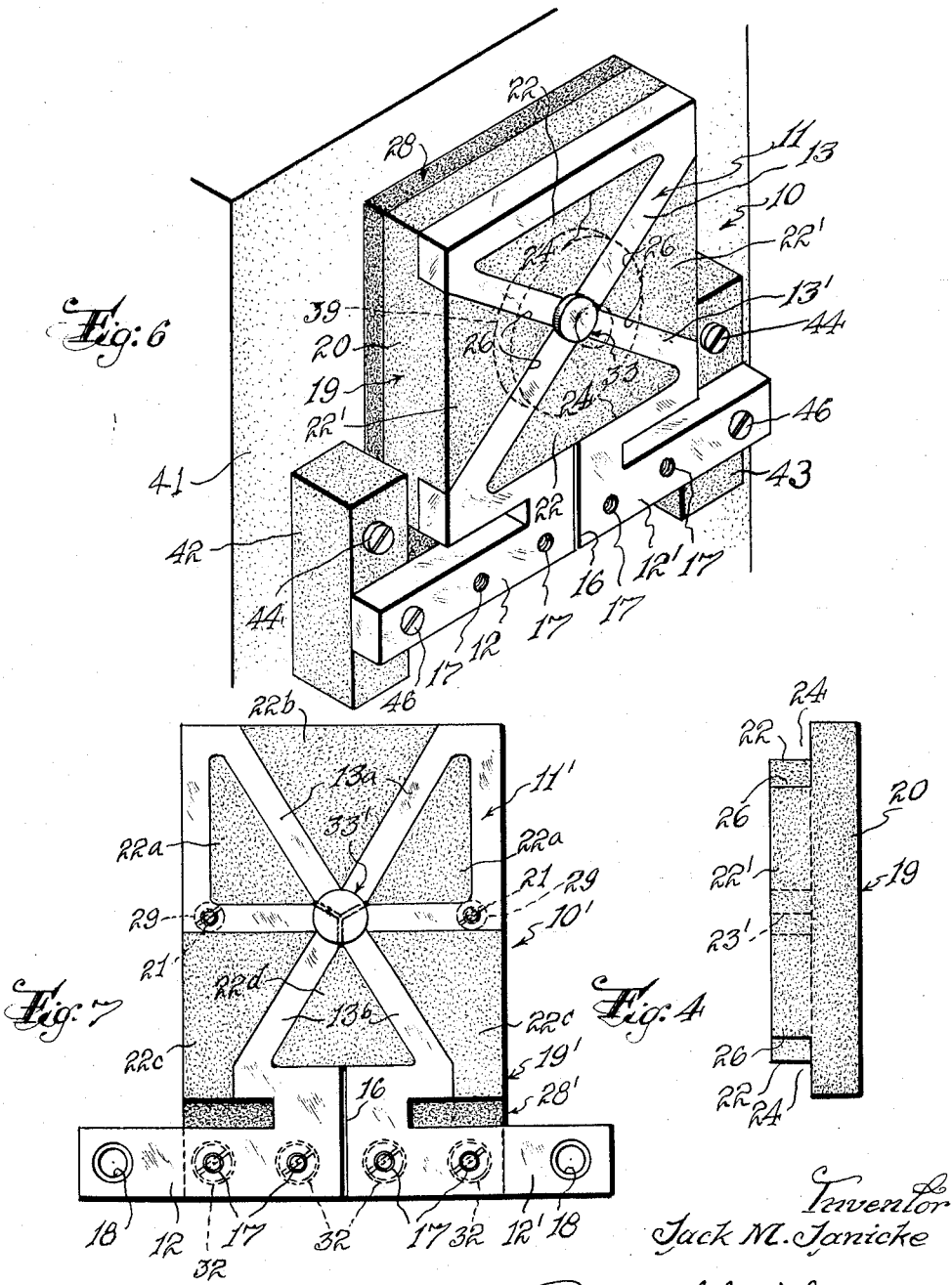
Inventor:
Jack M. Janicke
By Rudolph J. Jurick
Attorney United States Patent Office 2,962,637
Patented Nov. 29, 1960

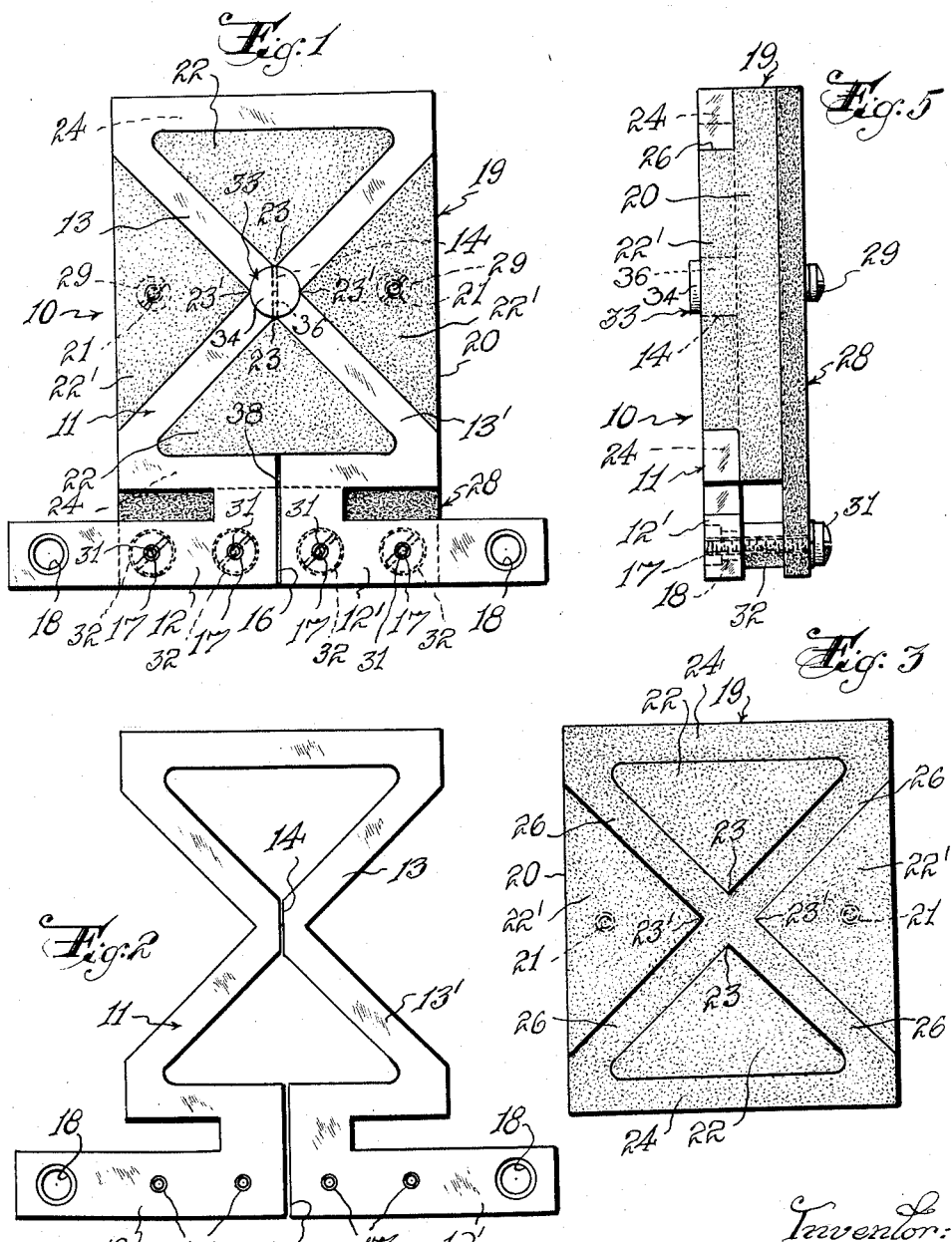

2,962,637
MAGNET CHARGER ADAPTER

Jack M. Janicke, Butler, N.J., assignor to Radio Frequency Laboratories, Inc., Boonton, N.J., a corporation of New Jersey Filed Mar. 21, 1957, Ser. No. 647,722
9 Claims. (Cl. 317—203)

This invention relates to magnetizing apparatus and more particularly to a charging adapter for removable connection to permanent contact bars of a magnet charger.

In magnet charging apparatus of the type to which this invention is directed, a direct current pulse of high magnitude is passed through a copper conductor. The resulting high intensity magnetic field, which surrounds the conductor, is utilized to charge the magnet, the latter being disposed in the magnetic field and oriented to provide desired magnetic poles.

The adapter of my invention is used in producing a plurality of uniform-strength magnetic poles in a member having a plane surface thereon, and particularly in a ring or disc-shaped member, such as a ring or disc magnet. In many contemporary charging adapters, the electric and/or magnetic circuit of the adapter must be broken, or opened, in order to properly position the member to be charged. This results in a mechanical arrangement which requires an appreciable amount of time to disassemble and assemble each time a member is to be charged, and if the electrical current-conducting circuit is broken each time, care must be taken to provide a mechanical joint which offers no appreciable resistance to the charging current. Other contemporary multipole magnetizers are provided with a plurality of wound poles; i.e. the same number of wound poles as the poles on the member to be charged. Such devices are relatively expensive.

An object of this invention is the provision of an adapter for a magnet charger, which adapter is of rugged construction and economically produced.

An object of this invention is the provision of a multipole adapter for a magnet charger for use in charging multipole magnets with uniform strength magnetic poles.

An object of this invention is the provision of a multipole adapter for a magnet charger including a current conductor securely embedded in recesses in a metal pole piece, which adapter is capable of withstanding high mechanical stresses produced during the flow of charging current.

An object of this invention is the provision of an adapter for a magnet charger comprising an electrical current conductor, a metal pole piece, and means forming irregular-shaped recessed portions in the face of the said pole piece, the said electrical conductor being insulatedly supported in the said recessed portion in the pole piece and retained in good mechanical relation therewith.

These and other objects and advantages will become apparent from the following description when taken with the accompanying drawings. It will be understood, however, that the drawings are for purposes of illustration and are not to be construed as defining the scope or limits of the invention, reference being had for the latter purposes to the appended claims.

In the drawings wherein like reference characters denote like parts in the several views:

Figure 1 is a front view of a four-pole adapter made in accordance with this invention;
Figure 2 is a front view of the conductor of the adapter;
Figure 3 is a front view of the pole piece of the adapter;
Figure 4 is a side view of the pole piece shown in Figure 3;
Figure 5 is a side view of the adapter;
Figure 6 is a perspective view of the four-pole adapter positioned on the mounting plate of a magnet charger; and
Figure 7 is a front view of a modified six-pole adapter.

Reference is now made to Figure 1 of the drawings wherein there is shown an adapter 10 comprising an electrical adapter conductor 11 having a pair of spaced connecting and mounting portions 12, 12' adjacent the ends thereof, and an intermediate portion forming upper and lower triangular-shaped sections 13, 13'. As best seen in Figure 2 of the drawings, the conductor 11 forms a continuous series circuit path; there being a gap 14 through the apexes of the triangular-shaped sections 13, 13' and a gap 16 between the connecting and mounting portions 12, 12'. The connecting and mounting portions 12, 12' are each provided with a pair of internally threaded mounting holes 17 and a connecting hole 18. As described in detail hereinbelow, with reference to Figure 6, the electrical conductor 11 is bolted to a magnet charger by means of bolts which extend through the holes 18. The electrical conductor which is made of a low electrical resistance material such as silver plated copper, is insulatedly supported upon a pole piece 19 made of cold rolled steel or other suitable material having great strength.

Referring now to Figures 3 and 4, the pole piece 19 comprises a rectangular-shaped plane member 20 having a pair of threaded mounting holes 21 on the back side thereof. A plurality of integrally formed bosses 22 and 22' are formed on the face of the plane member 20, which bosses are of a generally triangular shape having apexes 23 and 23' respectively, which terminate a spaced distance apart adjacent the center of the pole piece. The bases of the upper and lower bosses 22 are positioned a spaced distance from the upper and lower edges, respectively, of the pole piece. The bosses result in horizontally extending upper and lower recesses 24 in the pole piece and a pair of generally diagonally extending recesses 26 therein within which the conductor 11 is supported, as shown in Figure 1. Insulating means, not shown in the drawings, are provided between the pole piece and electrical conductor and may comprise, for example, a lining of suitable electrical tape positioned in the recesses.

The electrical conductor 11 and pole piece 20 are independently bolted to a mounting plate 28, which is made of suitable insulating material. Referring again to Figure 1, and to Figure 5, the steel pole piece 19 is shown secured to the mounting plate 28 by means of bolts 29 which extend through holes in the mounting plate, and are threaded into the holes 21 in the pole piece. The connecting and mounting portions 12, 12', of the electrical conductor 11, on the other hand, are secured to the mounting plate 28 by means of bolts 31 which extend through holes in the mounting plate and spacer members 32, and which are threaded into the holes 17 in the conductor.

A centering, or locating, pin 33 made of suitable insulating material is secured, as by cementing or other suitable means, to the electrical conductor 11 adjacent the apexes of the triangular configurations 13 and 13' formed by the conductor. The locating pin 33 comprises a cylindrical-shaped head portion 34, which extends above the face of the conductor and pole pieces, and a perpendicularly-positioned member 36 attached thereto and extending into the gap 14 through the apexes of the triangular-shaped portions 13, 13' of the conductor. The centering, or locating, pin serves to center the magnet to be charged on the adapter in a manner shown in Figure 6. In addition, the member 36 provides insulation between the adjacent portions of the conductor at the gap 14. An insulating member 38 is also positioned between the adjacent ends of the connecting and mounting portions 12, 12' of the conductor 11 at the gap 16 providing insulation thereat.

Reference is now made to Figure 6 of the drawings, wherein the adapter 10 is shown secured in operative position for charging a disc, or ring, magnet 39, shown in broken lines. There is here shown a panel 41, made of a suitable insulating material, and carried by a magnet charger. Extending through the panel are a pair of spaced, parallel contact bars 42, 43, which bars are firmly secured to and form the ends of a single turn, heavy, secondary coil of the magnet charger transformer, not shown. Such bars are secured to the transformer coil by means of bolts, such as the bolts 44, to form a good physical and electrical contact therewith. In turn, the mounting and connecting portions 12, 12', of the conductor 11, are secured to the cooperating contact bars 42, 43 by bolts 46 which enter into threaded holes provided in the contact bars. The mating surfaces of the contact bars and the mounting and connecting portions 12, 12' are carefully milled and preferably cleaned before assembly, all for the purpose of reducing to a minimum the electrical resistance of the joint so formed.

The magnet 39 to be charged, is centered on the conductor 11 and pole piece 19 by means of the centering pin 33, the diameter of which is substantially the same as the diameter of the hole in the magnet. The face of the conductor and pole piece are ground smooth before locating pin 33 is attached thereto, in order to insure good contact between the face of the magnet 39 and the conductor and pole piece. The charging current passing through the conductor 11 produces a four pole magnet with the adapter shown; poles of one polarity being produced in the magnet 39 adjacent the bosses 22, and of the other polarity adjacent the bosses 22', as will be well understood by those skilled in this art. The steel pole piece 19 provides sufficient rigidity to the conductor 11 to withstand the large mechanical forces thereon during the flow of charging current. The only electrical connection on the adapter is between the conductor 11 and the contact bars 42 and 43, and since this remains fixed once the adapter is mounted, none of the problems encountered in the type adapter requiring a removable or disconnecting part are present. Once the adapter is fixed to the magnet charger, the operator has only to position the magnet to be charged against the conductor and pole piece, using the locating pin to properly position the magnet. Poles of uniform strength may thereby be created on the magnet easily and quickly.

It will be understood that a conductor and pole piece of a modified shape may be used to produce multipolar magnets having a different number of poles. A six pole adapter, of the type contemplated by my invention, is shown in Figure 7 of the drawings. Referring to Figure 7, the adapter 10' comprises a conductor 11' having three generally triangular-shaped sections 13a, 13b. (The sections 13a closely approach a triangular-shape and are, therefore, described as being generally triangular-shaped.) A plurality of generally triangular-shaped bosses 22a, 22b, 22c, 22d are positioned on the pole piece 19' forming recesses on the pole piece within which the conductor 11' is insulatedly supported. A centering, or locating, pin 33' fastened to the center of the triangular-shaped configuration of the conductor provides a means for centering the magnet to be charged; the diameter of the pin being of substantially the same diameter as the hole in the said magnet. Three poles of one polarity are created in a magnet in that portion adjacent the bosses 22a and 22d, and three poles of opposite polarity are produced adjacent the bosses 22b and 22c, as will be well understood.

Having now described my invention in detail, in accordance with the patent statutes, various other changes and modifications will occur to those skilled in this art. It is intended that such changes and modifications shall fall within the scope and spirit of the invention, as recited in the following claims.

I claim:

1. An adapter for a magnet charger, the said adapter comprising an adapter conductor, the said adapter conductor forming a plurality of coplaner and generally triangular-shaped sections, one corner of each of the said triangular-shaped sections being in a spaced adjacent relation, a magnetic pole piece, means forming a recessed portion in the face of the said pole piece having a similar configuration as the said triangular-shaped sections of the said adapter conductor, and means insulatingly supporting the said adapter conductor in the said recessed portion in the pole piece.

2. The invention as recited in claim 1 including a locating pin of insulating material positioned on the said electrical adapter conductor at the adjacent corners of the triangular-shaped sections thereof.

3. The invention as recited in claim 1 wherein the said adapter conductor forms a pair of the said triangular-shaped sections.

4. The invention as recited in claim 1 wherein the said adapter conductor forms three of the said triangular-shaped sections.

5. An adapter for a magnet charger, the said adapter comprising an electrical adapter conductor, a pole piece of magnetic material having a plurality of triangular-shaped bosses extending therefrom, the apexes of the said bosses being positioned a spaced distance apart adjacent the center of the said pole piece, and means insulatingly supporting the said adapter conductor on the pole piece adjacent the sides of the said bosses in a non-overlapping manner.

6. The invention as recited in claim 5 wherein the said pole piece is made of rolled steel.

7. The invention as recited in claim 5 including a locating pin of insulating material positioned on the said adapter conductor adjacent the apexes of the said bosses.

8. An adapter for a magnet charger, the said adapter comprising an electrical adapter conductor, a mounting plate made of insulating material, a pole piece of magnetic material having a plurality of generally triangular-shaped bosses formed thereon, the apexes of the said bosses being positioned a spaced distance apart adjacent the center of the said pole piece, means attaching the said pole piece to the said mounting plate, means attaching the said adapter conductor to the said mounting plate, means insulating supporting the said adapter conductor on the said pole piece adjacent the sides of the said bosses in a non-overlapping manner, the face of the said adapter conductor being substantially flush with the faces of the said bosses, and a locating pin of insulating material positioned on the face of the said adapter conductor adjacent the apexes of the said triangular-shaped bosses.

9. The invention as recited in claim 8 wherein the said adapter conductor is made of copper and the said pole piece is made of steel.

References Cited in the file of this patent

UNITED STATES PATENTS

| | | |
|---|---|---|
| 1,293,912 | Porter | Feb. 11, 1919 |
| 2,300,520 | Pollard | Nov. 3, 1942 |
| 2,442,808 | Granberry | June 8, 1948 |
| 2,536,227 | Rozett | Jan. 2, 1951 |